(12) United States Patent  
King et al.

(10) Patent No.: US 8,922,397 B2
(45) Date of Patent: Dec. 30, 2014

(54) METHOD AND SYSTEM OF LOCATING STATIONARY VEHICLE WITH REMOTE DEVICE

(75) Inventors: Ronald O. King, Brownstown, MI (US); Yi Luo, Superior Township, MI (US)

(73) Assignee: Lear Corporation, Southfield, MI (US)

( * ) Notice: Subject to any disclaimer, the term of this patent is extended or adjusted under 35 U.S.C. 154(b) by 1350 days.

(21) Appl. No.: 12/405,319

(22) Filed: Mar. 17, 2009

(65) Prior Publication Data

US 2010/0241347 A1 Sep. 23, 2010

(51) Int. Cl.
*G08G 1/123* (2006.01)
*G01C 21/36* (2006.01)

(52) U.S. Cl.
CPC ........ *G01C 21/3688* (2013.01); *G01C 21/3682* (2013.01); *G01C 21/3635* (2013.01)
USPC .................. 340/990; 340/995.12; 340/995.14; 340/995.23; 701/438; 701/453

(58) Field of Classification Search
USPC ................... 701/200; 340/988, 995.19, 932.2
See application file for complete search history.

(56) References Cited

U.S. PATENT DOCUMENTS

| | | | |
|---|---|---|---|
| 4,673,921 A | 6/1987 | Saito et al. | |
| 5,089,803 A | 2/1992 | Bohn | |
| 6,298,803 B1 | 10/2001 | Gregg | |
| 2003/0182052 A1* | 9/2003 | DeLorme et al. | ............. 701/201 |
| 2005/0228583 A1 | 10/2005 | Capuano | |
| 2007/0273553 A1 | 11/2007 | Albrecht et al. | |
| 2008/0105344 A1 | 5/2008 | Losey et al. | |
| 2009/0091477 A1* | 4/2009 | McCall et al. | ................ 340/990 |

* cited by examiner

*Primary Examiner* — Minnah Seoh
(74) *Attorney, Agent, or Firm* — Brooks Kushman P.C.

(57) ABSTRACT

A location system for use in locating a vehicle or other object. The system may include displaying directional information on a mobile device, such as but not limited to a mobile phone, personal digital assistant (PDA), remote vehicle control device (fob, RKE, passive entry, etc.). The displayed directional information may indicate a direction of travel to the vehicle without requiring the mobile device to rely on GPS satellites to determine a position useful in orientating the user in a direction toward the vehicle.

21 Claims, 4 Drawing Sheets

METHOD AND SYSTEM OF LOCATING STATIONARY VEHICLE WITH REMOTE DEVICE

BACKGROUND OF THE INVENTION

1. Field of the Invention

The present invention relates to methods and systems of locating an object, such as but not limited to a vehicle, through information shown within a display of a remote device.

2. Background Art

When a user moves away from an object, such as but not limited to a stationary object like a vehicle, the user may require directional instructions in order to return to the object. In the past, a handheld GPS unit could be used by the user to fix their current location. If the user programmed a waypoint or otherwise knew the location of the object, the user could request the GPS unit map a route from their current location to the object.

To support this type of handheld operation, the user device is forced to rely upon GPS satellites to fix the position. This type of circuitry is relative expensive to include within a remote, handheld device. Moreover, the reliance on energy consuming wireless communications and can be problematic since the wireless communications, especially those required to support GPS operations, can consume relatively large quantities of energy from a battery of the mobile device.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
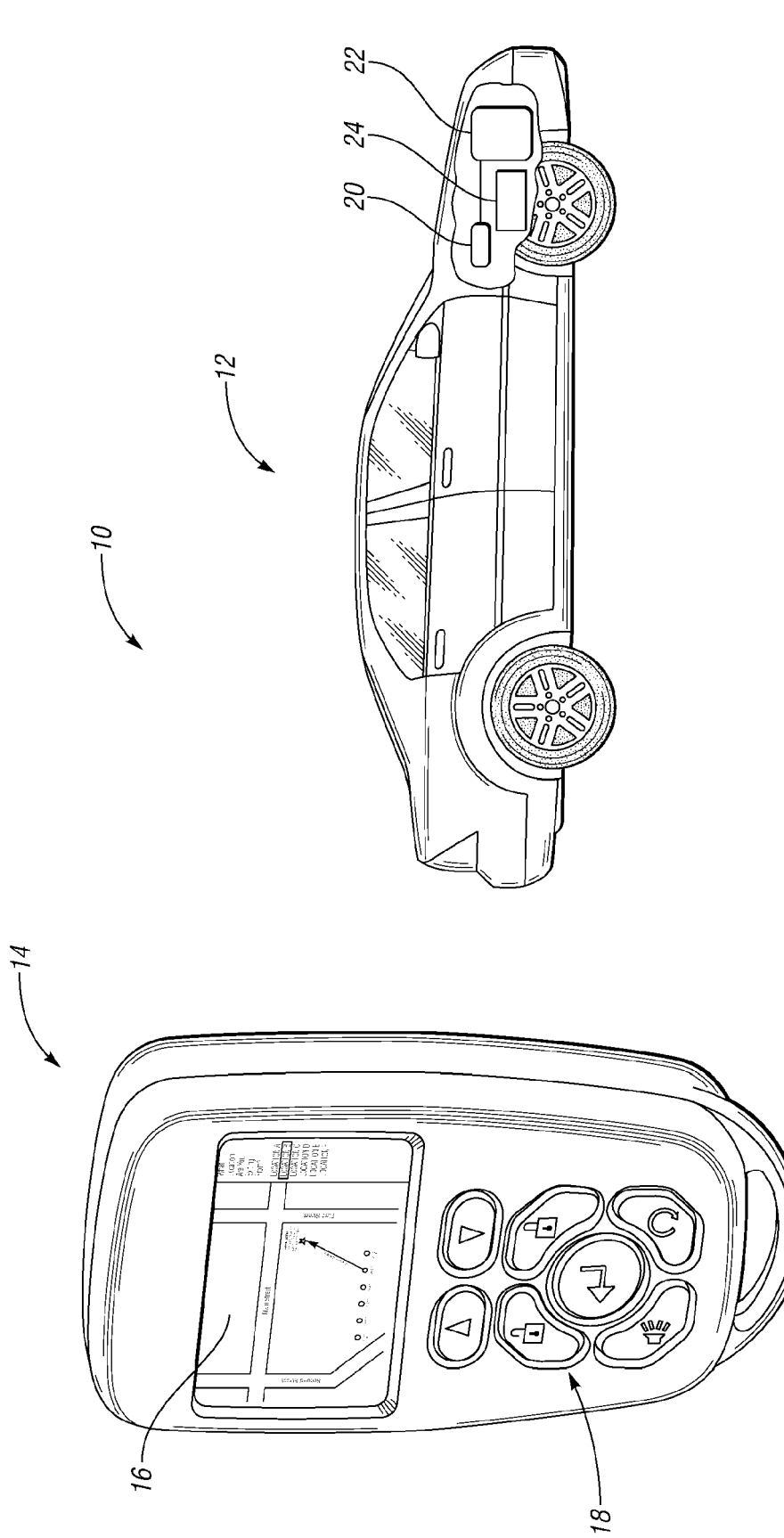
FIG. 1 illustrates an object location system in accordance with one non-limiting aspect of the present invention.

FIG. 1 illustrates a system 10 for locating an object 12 with the assistance of directional information displayed on a mobile device 14 in accordance with one non-limiting aspect of the present invention. For exemplary purposes and without intending to limit the scope and contemplation of the present invention, the system 10 is predominantly described with respect to the mobile device 14 being a remote keyless entry (RKE) fob and the object 12 being a parked vehicle. While this exemplary embodiment is set forth, the present invention fully contemplates its use and application in locating other stationary or non-stationary objects or the use of any other mobile device.

The fob 14 may include a display 16 and a number of buttons 18 to facilitate RKE related controls of the vehicle. User selection of one of the buttons 18 may be used to instigate transmission of a related control signal to the vehicle 12. The fob 14, for example, may include a lock button, and unlock button, a panic button, a turn button, a start button, an up button, and a down button to facilitate wireless transmission of related control signals. The vehicle 12 may include a wireless transceiver 20 or RKE unit to interface the wireless signals with a vehicle control unit 22. The vehicle control unit 22 may control one or more vehicle systems according to instructions specified within the wireless signals.

The system 10 may further include a navigation system 24 or global positioning system (GPS) within the vehicle 12. The navigation system 24 may interact with GPS satellites or other navigational aids to determine vehicle location (VL) coordinates and other positioning related information, such information or coordinates on points of interest (POI) proximate the vehicle 12, a route for the vehicle 12 to reach a desired destination, and other information commonly used to support navigation related operations. The navigation system 24 may be used to facilitate providing directional information to a driver of the vehicle 12 and/to the fob 14, at least as contemplated by the present invention.

Figure 2:
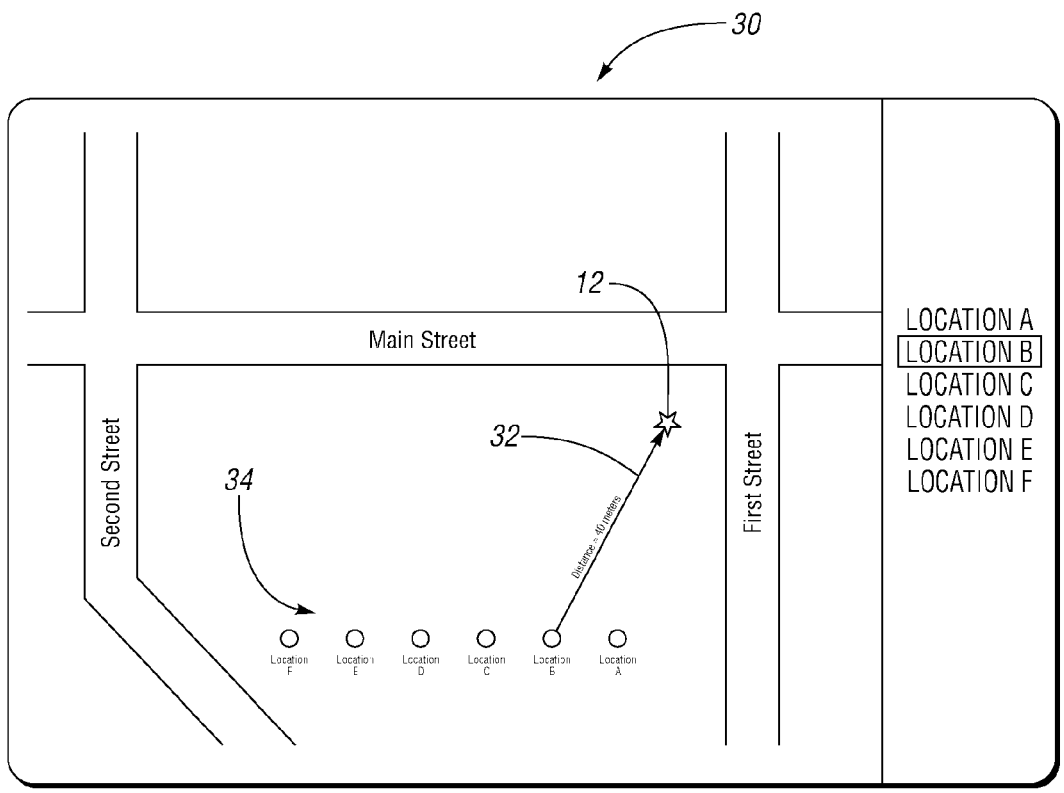
FIGS. 2-3 illustrate a two-dimension display for displaying directional information in accordance with one non-limiting aspect of the present invention.

FIG. 2 illustrates a first display 30 of directional information that may be shown within the display 15 to facilitate locating the vehicle 12 in accordance with one non-limiting aspect of the present invention. The display 16 may be used to display directional information collected by the navigation system 24 in order to assist a user in locating the vehicle 12 while the user is at a remote location. In more detail, a direction to the vehicle 12 from a selected location may be indicated with a directional indicator 32. This allows the user to approximate their direction to the vehicle 12 without having to rely on wireless communications to establish their current location or the relative location of the vehicle 12.

Optionally, the selected location may be one of a number of POIs 34 within a vicinity of the vehicle 12. The displayed POIs 34 may be determined by the navigation system 24 to correspond with buildings, offices, restaurants, gas stations, addresses, intersections, street names, and other features proximate to the vehicle 12. These points of interest 34 may be specified by the driver prior to exiting the vehicle 12 and/or automatically determined by the navigation system 24 based on driver habits or other parameters. The navigation system 24 may transmit coordinates for the POI and VL to the fob 14 to facilitate displaying information shown in FIG. 2.

The transmission of the POI and VL coordinates may require the fob 14 to process the coordinates in a manner that allows the fob 14 to display the POIs with a proper spatial relation to the vehicle 12. The fob 14 may also be required to calculate a distance and angle from each of the POIs to the vehicle based on a comparison of the POI and VL coordinates. The navigation system 24 or vehicle controller 22, optionally, may be configured to perform the same or similar calculations prior to transmitting the POI and VL coordinates to the fob 14. This may be helpful in limiting the directional information processing demands on the fob 14.

Figure 3:
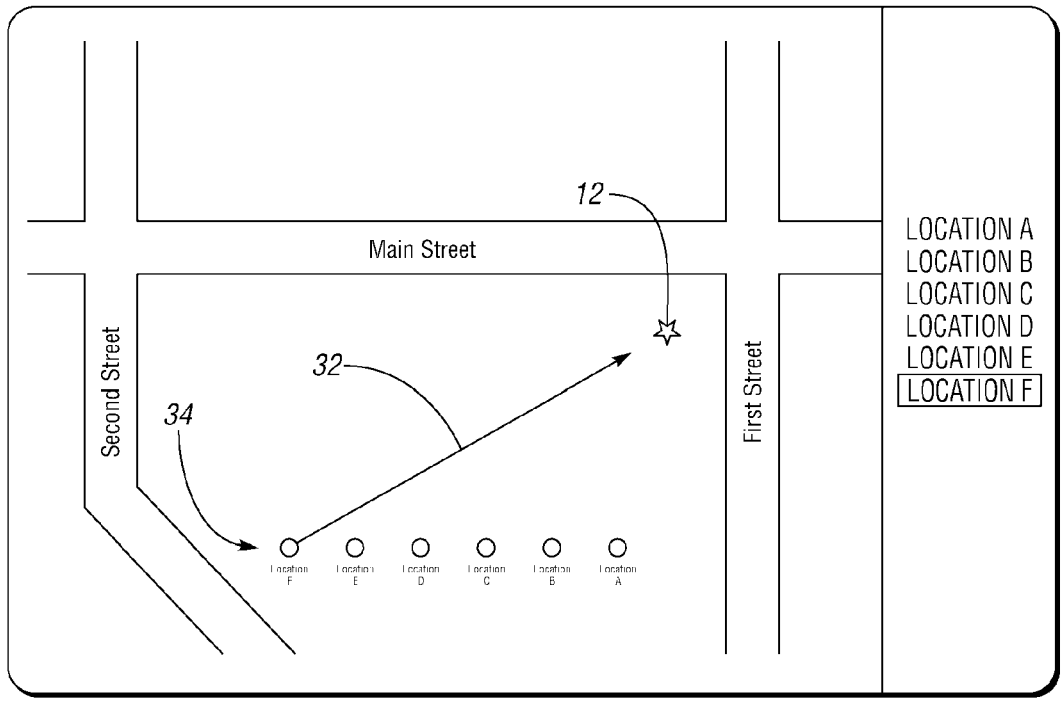

The direction 32 shown in FIG. 2 is based on a distance and angle that must be traveled if the user were to reach the vehicle from location B. FIG. 3 illustrates a change in the direction 32 that must be traveled by the user if the user were to reach the vehicle from location F. As shown the distance and heading to the vehicle 12 changes to reflect approximate or different distance and angle that must be traveled to reach the vehicle 12 from one of the POIs 34 if traveling in a straight line. Obstacles or other impediments may be shown in the display 16 and/or the direction 32 may present or otherwise alter a route to the vehicle 12 in order to compensate for the impediment, such as with illustration of stairs, turns, and other changes in direction that the user must traverse to reach the vehicle.

The fob 14 may be configured to support display of the directional information shown in FIGS. 2 and 3 without reliance on fob determined GPS coordinates and/or other fob wireless communications, other than those occurring when the VL and POI coordinates are transmitted to the fob 14. This may allow the fob 14 to display information to locate the vehicle 12 when the fob 14 is beyond a wireless communication range of the vehicle 12 and when the fob 14 is within a building or other location beyond a wireless communications range of GPS satellites.

Because the fob 14 may not be required to actively engage in wireless communications to facilitate display of the directional information at a time when the user requires the directional information, the fob 14 is able to conserve battery life and extend usage since its electrical energy is not consumed in executing wireless communications.

Figure 4:
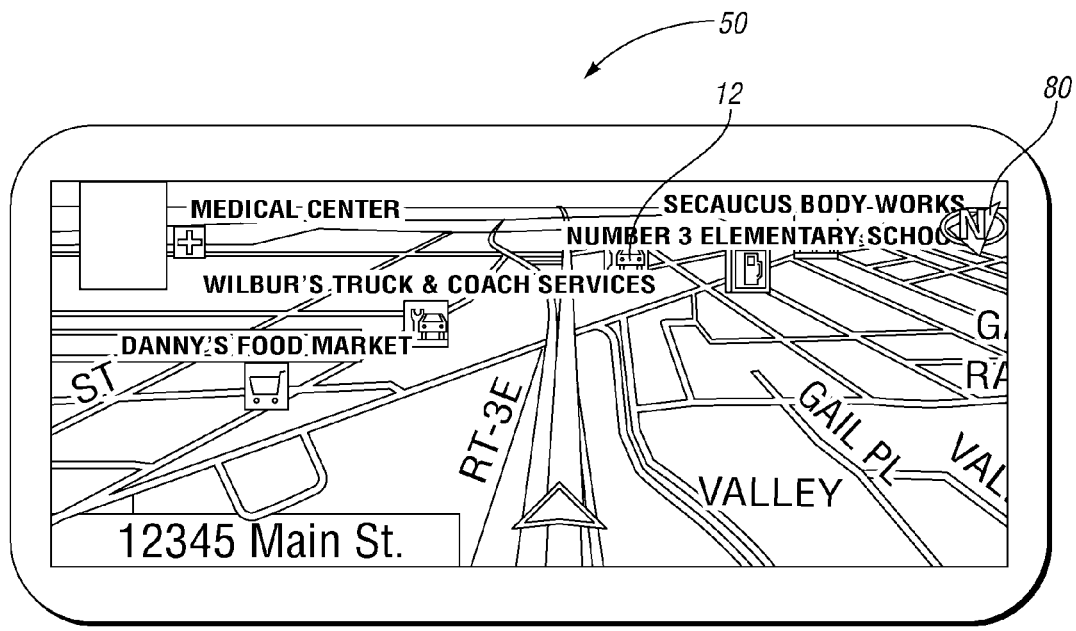
FIG. 4 illustrates a three-dimension, street-level display for displaying directional information in accordance with one non-limiting aspect of the present invention.

The directional information shown in FIGS. 2 and 3 provide a two dimensional representation of the vehicle's position relative to one of the POIs. FIG. 4 illustrates a three dimensional, street-level map 40 that may be shown to facilitate locating the vehicle 12 in accordance with one non-limiting aspect of the present invention. The street-level view shown in FIG. 4 may be helpful in displaying information from a perspective of the user at each of the POIs. A street-level, perspective of the information shown in the display 40 may change depending on the selected POI, e.g. according to the perspective view at that location. In contrast, the perspective of FIGS. 2 and 3 remains constant for selection of each of the POIs, unless the user otherwise changes the perspective by changing a scaling or requesting the display of additional POIs.

Figures 5A, 5B, 5C:
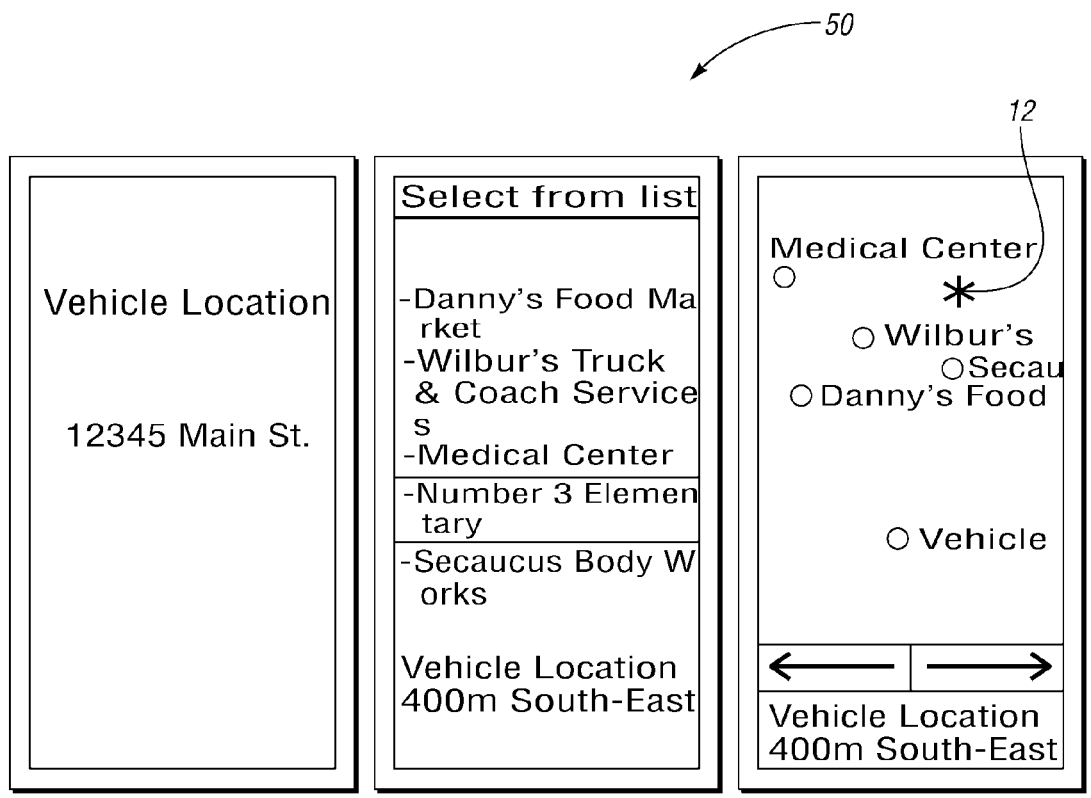
FIGS. 5a-5c illustrate a textual display for displaying directional information in accordance with one non-limiting aspect of the present invention.

FIG. 5a-c illustrates a display 50 of directional information in accordance with one non-limiting aspect of the present invention. The directional information shown in FIGS. 5a-5c is graphically limited to the display of textual information. FIG. 5a simply describes the current location of the vehicle. FIG. 5b displays the POIs in a selectable list. FIG. 5c spatially illustrates an approximate position of the POIs relative to the vehicle without additional graphics and details shown in FIGS. 2-4. This can be helpful in limiting the processing demands on the fob and the display requirements for the fob.

Figure 6:
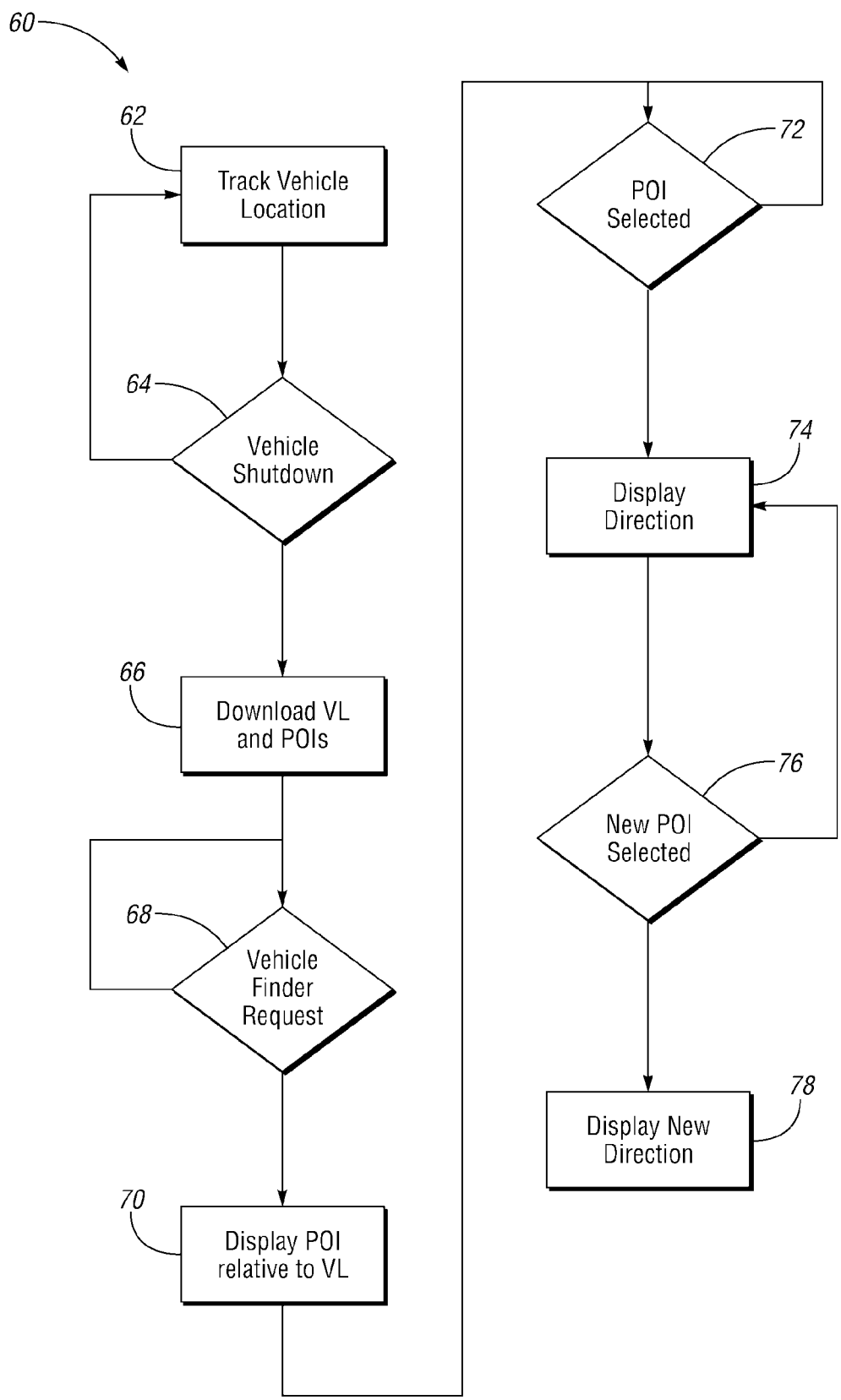
FIG. 6 illustrates a flowchart of method of locating an object in accordance with one non-limiting aspect of the present invention.

FIG. 6 illustrates a flowchart 60 of a method for locating a vehicle in accordance with one non-limiting aspect of the present invention. While the method is described with respect to locating a vehicle, the method may apply to locating any type of object and not necessarily a vehicle or a stationary object. The operations contemplated by the method of the present invention may be implemented with the assistance of operations coordinated according to instructions embedded within a computer-readable medium of the vehicle 12 and the fob 14.

Block 62 relates to tracking vehicle location (VL) information while the vehicle is operating. The navigation system 24 may be used to track the VL information based on data received from GPS satellites or other locating features. The tracking of the current vehicle location may include tracking POIs relative to the current VL. Optionally, to conserve processing demands, identification of the POIs may be delayed until a later point in time, such as until when the POIs are required for transmission to the fob 14.

Block 64 relates to determining a vehicle shutdown event or other event indicating a potential need to locate the vehicle 12 with the fob 14. The vehicle shutdown event may be determined when a vehicle ignition is turned off, when a passive entry system determines a user to be exiting the vehicle, upon actuation of a RKE button 18, or other suitable event that may be used to represent a need to locate the vehicle.

Block 66 relates to downloading VL and POI information to the fob 14 upon occurrence of the shutdown event. The downloaded information may optionally include directional information for indicating a direction to the vehicle 12 for each of the POIs. The information may be downloaded to the fob 14 through wireless communications. This may include communicating a wake-up signal to the fob 14 and following that communication with a data transfer of the directional information, e.g., the VL coordinates, POI coordinates, directional indicators, etc.

Block 68 relates to determining user selection of a vehicle finder request. The user selection of the vehicle finder request may be determined from user input to the fob, such as upon user activation of one of the RKE buttons 18. Block 70 relates to the fob displaying the POI information relative to the VL information, such as in the manner shown within FIGS. 2-5c. The displayed directional information may spatially represent each of the POIs relative to the VL without indicating a direction of travel from one of the POIs to the VL.

Block 72 relates to user selection of one of the displayed POIs. Upon selection of one of the POI, a direction arrow or other indication of the distance and heading from the selected POI to the VL may be shown within the display 16. The direction to the vehicle 12 from the selected POI may be calculated by the fob 14 based on a comparison of the selected POI and VL coordinates at this time if the direction was not already otherwise specified in the information download to the fob 14 at block 66.

The direction shown within the display 16 remains displayed until a new POI is selected in block 76 and shown within block 78. The direction displayed in either one of blocks 74, 78 may be held constant as the user moves from the current location towards the vehicle. Optionally, the fob 14 may display a compass heading 80 (see FIG. 4) based on information provided from a compass included on the fob to facilitate orientating the user to the vehicle relative to their current location.

Another option may include adjusting the display direction to the vehicle based on a change in position of the user. For example, upon actuation of vehicle finder request, an accelerometer or other non-communicative data collection device may be used to approximate a distance in direction traveled by the user. This information can be used to adjust the displayed direction to compensate for a change in position of the user. Optionally, an icon or other feature may be shown within the display to illustrate movement of the user relative to the POIs and the VL.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A method of locating a stationary vehicle with a fob comprising:
   receiving vehicle location (VL) coordinates transmitted from the vehicle, the VL coordinates being determined by a vehicle Global Positioning System (GPS) unit included in the vehicle to represent a GPS-based position of the vehicle;
   receiving points of interest (POI) coordinates transmitted from the vehicle, the POI coordinates being determined by the vehicle unit included in the vehicle, the POI coordinates representing a GPS-based position for each of a plurality of POIs, the POIs corresponding with stationary objects within a vicinity of the vehicle;
   displaying a direction to the vehicle on a display of the fob, the displayed direction being determined as a function of the VL and POI coordinates transmitted to the fob to represent positioning of the vehicle relative to the POIs;
   receiving at least two different POI coordinates and displaying the direction to the vehicle relative a selected one of the POI coordinates;
   displaying the at least two different POI coordinates on the fob, the selected one of the POI coordinates corresponding with a user selection of one of the at least two different POI coordinates displayed on the fob; and
   after displaying the direction to the vehicle, displaying another direction to the vehicle with display of a second directional arrow, the second directional arrow being displayed upon subsequent selection of another one of the POI coordinates, the second directional arrow being displayed to originate proximate to the another one of the POI coordinates and to terminate proximate the displayed icon, the length and the angle of the first directional arrow remaining constant during user movement occurring after user selection of the selected one of the POI coordinates and prior to selection of the another one of the POI coordinates.

2. The method of claim 1 further comprising the vehicle GPS unit determining the direction to the vehicle for at least a first one of the POI coordinates prior to the fob receiving the VL and POI coordinates, the fob relying on the vehicle GPS unit determined directions to display the direction to the vehicle from the first one of the POI coordinates.

3. The method of claim 1 further comprising the fob determining the direction to the vehicle for at least one of the POI coordinates after the VL and POI coordinates are received by the fob.

4. The method of claim 1 further comprising displaying the at least two different POI coordinates on the fob, the selected one of the POI coordinates corresponding with user selection of one of the at least two different POI coordinates displayed on the fob.

5. The method of claim 1 further comprising displaying the direction to the vehicle as a first directional arrow representative of a distance and a direction to the vehicle, the first directional arrow being displayed to originate proximate the selected one of the POI coordinates and to terminate proximate a displayed icon representing a relative position of the vehicle, the first directional arrow being displayed with a first length and a first angle respectively representing the distance and the direction from the selected one of the POI coordinates to the vehicle.

6. The method of claim 1 further comprising the fob receiving the VL and POI coordinates after an ignition of the vehicle is turned off and prior to exceeding a wireless communication range to the vehicle, the fob displaying the direction to the vehicle after exceeding the wireless communication range.

7. The method of claim 1 further comprising the fob displaying the direction to the vehicle without requiring the fob to independently collect GPS coordinates and while the fob exceeds a wireless communication range to the vehicle, the direction displaying a distance and an angle to the vehicle.

8. The method of claim 1 further comprising the fob adjusting the displayed direction to the vehicle as a function of a change in position of the fob relative to the vehicle, the change in position occurring after selecting the selected one of the POI coordinates.

9. The method of claim 8 further comprising the fob determining the change in position of the fob without requiring the fob to independently collect GPS coordinates.

10. The method of claim 8 further comprising the fob determining the change in position of the fob as a function of movement information collected by an accelerometer included within the fob.

11. The method of claim 1 further comprising displaying the direction to the vehicle to at least included a compass bearing and a distance to the vehicle, where the displayed compass bearing remains constant with directional movement of the fob and the displayed distance remains constant as the fob moves closer to the vehicle.

12. An apparatus for locating a stationary vehicle, the apparatus comprising:
    a mobile device programmed to:
        receive vehicle location (VL) coordinates transmitted from the vehicle, the VL coordinates being determined by a vehicle Global Positioning System (GPS) unit included in the vehicle to represent a GPS-based position of the vehicle;
        receive points of interest (POI) coordinates transmitted from the vehicle, the POI coordinates being determined by the vehicle GPS unit included in the vehicle, the POI coordinates representing a GPS-based position for each of a plurality of POIs, the POIs corresponding with stationary objects within a vicinity of the vehicle;
        display a direction to the vehicle on a display of the fob, the displayed direction being determined as a function of the VL and POI coordinates transmitted to the fob to represent positioning of the vehicle relative to the POIs;
        receive at least two different POI coordinates and displaying the direction to the vehicle relative a selected one of the POI coordinates;
        display the at least two different POI coordinates on the fob, the selected one of the POI coordinates corresponding with user selection of one of the at least two different POI coordinates displayed on the fob; and
        after displaying the direction to the vehicle, display another direction to the vehicle with display of a second directional arrow, the second directional arrow being displayed upon subsequent selection of another one of the POI coordinates, the second directional arrow being displayed to originate proximate to the another one of the POI coordinates and to terminate proximate the displayed icon, the length and the angle of the first directional arrow remaining constant during user movement occurring after user selection of the selected one of the POI coordinates and prior to selection of the another one of the POI coordinates.

13. The apparatus of claim 12 wherein the mobile device is further programmed to determine the direction to the vehicle for at least one of the POI coordinates after the VL and POI coordinates are received by the mobile device.

14. The apparatus of claim 12 wherein the mobile device is further programmed to display the at least two different POI coordinates thereon, the selected one of the POI coordinates corresponding with user selection of one of the at least two different POI coordinates displayed on the fob.

15. The apparatus of claim 12 wherein the mobile device is further programmed to display the direction to the vehicle as a first directional arrow representative of a distance and a direction to the vehicle, the first directional arrow being displayed to originate proximate the selected one of the POI coordinates and to terminate proximate a displayed icon representing a relative position of the vehicle, the first directional arrow being displayed with a first length and a first angle respectively representing the distance and the direction from the selected one of the POI coordinates to the vehicle.

16. The apparatus of claim 12 wherein the mobile device is further programmed to receive the VL and POI coordinates after an ignition of the vehicle is turned off and prior to exceeding a wireless communication range to the vehicle, the mobile device displaying the direction to the vehicle after exceeding the wireless communication range.

17. The apparatus of claim 12 wherein the mobile device is further programmed to display the direction to the vehicle without requiring the mobile device to independently collect GPS coordinates and while the mobile device exceeds a wireless communication range to the vehicle, the direction displaying a distance and an angle to the vehicle.

18. The apparatus of claim 12 wherein the mobile device is further programmed to adjust the displayed direction to the vehicle as a function of a change in position of the mobile device relative to the vehicle, the change in position occurring after selecting the selected one of the POI coordinates.

19. The apparatus of claim 18 wherein the mobile device is further programmed to determine the change in position of the fob without requiring the fob to independently collect GPS coordinates.

20. The apparatus of claim 18 wherein the mobile device is further programmed to determine the change in position of the fob as a function of movement information collected by an accelerometer included within the mobile device.

21. The apparatus of claim 12 further comprising displaying the direction to the vehicle to at least included a compass bearing and a distance to the vehicle, where the displayed compass bearing remains constant with directional movement of the fob and the displayed distance remains constant as the fob moves closer to the vehicle.

* * * * *

UNITED STATES PATENT AND TRADEMARK OFFICE
CERTIFICATE OF CORRECTION

| | | |
|---|---|---|
| PATENT NO. | : 8,922,397 B2 | Page 1 of 1 |
| APPLICATION NO. | : 12/405319 | |
| DATED | : December 30, 2014 | |
| INVENTOR(S) | : Ronald O. King et al. | |

It is certified that error appears in the above-identified patent and that said Letters Patent is hereby corrected as shown below:

In the Claims,

Column 6, Line 24, Claim 11:

After "to the vehicle to at least"
Delete "included" and
Insert -- include --.

Column 8, Line 21, Claim 21:

After "to the vehicle to at least"
Delete "included" and
Insert -- include --.

Signed and Sealed this
Thirty-first Day of March, 2015

Michelle K. Lee
*Director of the United States Patent and Trademark Office*